United States Patent [19]

Kubicek

[11] 4,320,998
[45] Mar. 23, 1982

[54] DEBURRING TOOL

[76] Inventor: Louis A. Kubicek, 2124 Lake View, Ypsilanti, Mich. 48197

[21] Appl. No.: 147,568

[22] Filed: May 8, 1980

[51] Int. Cl.³ ............................................. B23B 51/16
[52] U.S. Cl. ................................ 408/226; 408/239 R; 408/714
[58] Field of Search .................. 408/226, 239 R, 228, 408/154–156, 197, 198, 233, 714; 279/1 A

[56] References Cited

U.S. PATENT DOCUMENTS

| | | | |
|---|---|---|---|
| 530,841 | 12/1894 | Hatmaker | 408/156 |
| 3,230,798 | 1/1966 | Kubicek et al. | 408/226 |
| 3,420,125 | 1/1969 | Cogsdill | 408/226 |
| 3,658,435 | 4/1972 | Kubicek | 408/239 R |
| 3,661,473 | 5/1972 | Kubicek | 408/239 R |
| 3,720,477 | 3/1973 | Rusin | 408/714 |
| 3,970,406 | 7/1976 | Kubicek | 408/127 |
| 3,975,111 | 8/1976 | Kubicek | 408/239 R |

Primary Examiner—Leonidas Vlachos
Attorney, Agent, or Firm—Gifford, VanOphem, Sheridan & Sprinkle

[57] ABSTRACT

An improved tool for removing burrs formed on the edge of drilled holes is provided and comprises a first and second elongated arm member. Each arm member includes arcuate cutting lobes formed on one axial end. The other axial end of each arm member is received within a collet so that the arm members are spaced from but substantially parallel to each other and with the cutting lobes positioned on the outer periphery of each arm member. The collet includes appropriate locking means whereby each arm member can be individually attached to and detached from the collet, and, preferably, the collet is adapted for attachment to the outwardly extending end of a tool holding rod of a tool holder.

6 Claims, 4 Drawing Figures

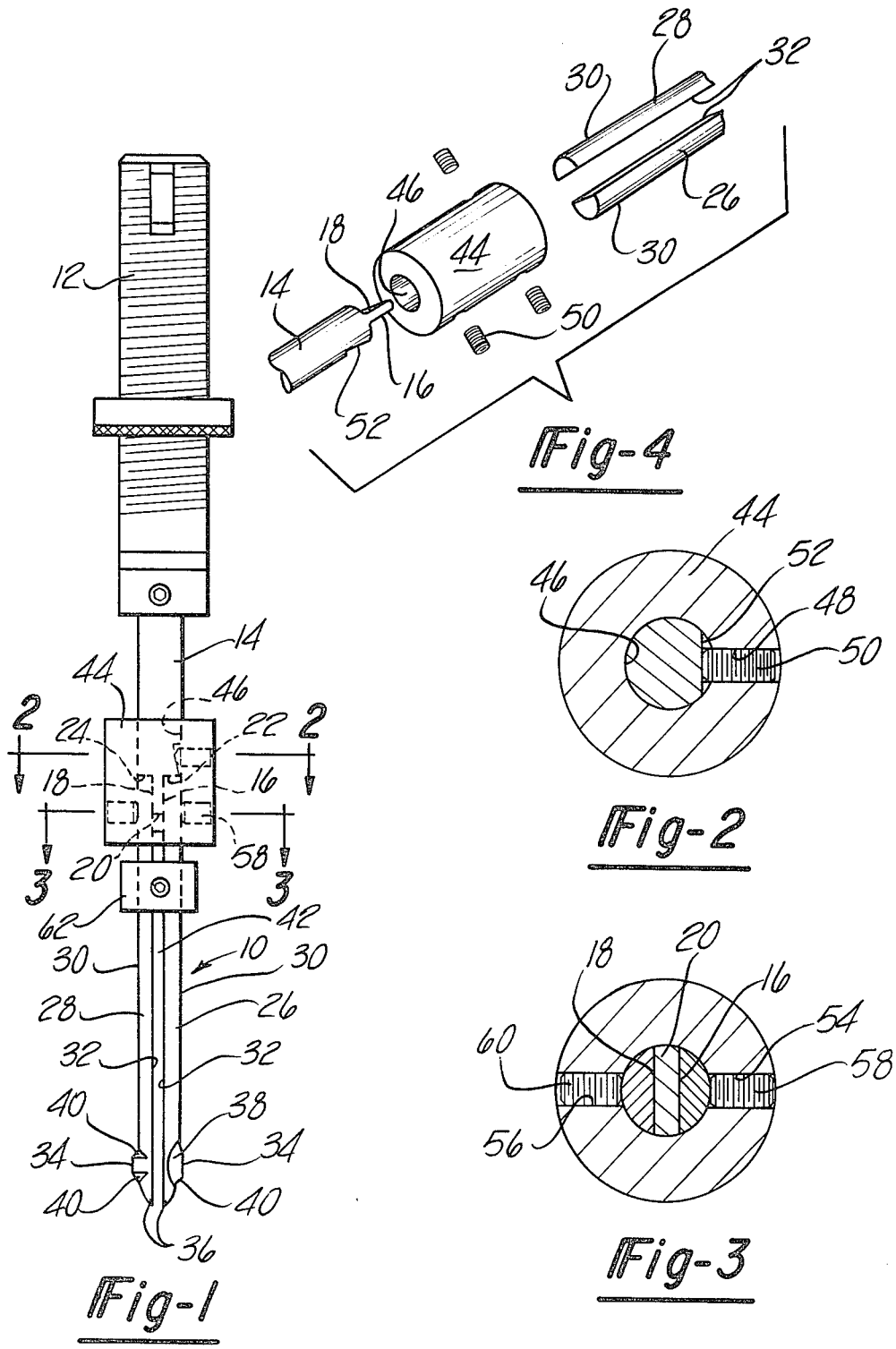

DEBURRING TOOL

BACKGROUND OF THE INVENTION

I. Field of the Invention

The present invention relates generally to deburring tools and, more particularly, to an improved deburring tool with detachable arm members.

II. Description of the Prior Art

There are several previously known deburring tools, many of which are adapted for attachment to the outwardly extending end of a tool holding rod on a tool holder. One such previous deburring tool is described in my previous U.S. Pat. No. 3,230,798, issued Jan. 25, 1966, which discloses a deburring tool having two elongated arm members. The arm members are arranged substantially parallel to but spaced from each other so that an elongated longitudinal slot is formed between the arm members. Arcuate cutting lobes are formed on the outer periphery at the outwardly extending end of each arm member which, upon rotation, remove burrs from a drilled hole. The slot between the arm mmebers, of course, permits the arm members to flex inwardly to permit passage of the arcuate cutting lobes through the drilled hole so that both sides of the hole can be deburred.

One disadvantage of my previously-known deburring tool is that after extended use one of the arm members or cutting lobes occasionally breaks or chips. This in turn requires replacement of the entire deburring tool since the tool, and hence the elongated arm members, is integrally constructed. Replacement of the entire deburring took, of course, is very expensive.

In contrast to my aforementioned, previously-known deburring tool, U.S. Pat. No. 3,720,477 which issued on Mar. 13, 1973 to D. J. Rusin, discloses a deburring tool in which one of the elongated arm members is detachably coupled to the deburring tool. The Rusin deburring tool, however, is disadvantageous in that an arcuate cutting lobe is formed on only the detachable arm member rather than on both arm members as taught by my deburring tool. As a result, the Rusin deburring tool is about only one-half as efficient in operation as my deburring tool since a longer dwell time is required.

A still further disadvantage of the Rusin deburring tool is that it requires an intricately machined, and consequently expensive, collet in order to secure the detachable arm member to the deburring tool. Thus, much of the economy obtained from the detachable arm member is lost in the construction of the collet.

A still further disadvantage of the Rusin deburring tool is that the collet for securing the detachable shank to the deburring tool also functions as a tensioning ring for the arm members. Readjustment of the Rusin collet, necessary to vary the tension between the arm members, is time consuming and difficult to manipulate.

SUMMARY OF THE PRESENT INVENTION

The deburring tool of the present invention overcomes the above-mentioned disadvantages of the previously-known deburring tools by providing a deburring tool in which the elongated arm members can be individually attached to and detached from the deburring tool.

In brief, the deburring tool of the present invention comprises a first and a second elongated arm member each of which is substantially identical to the other. Each arm member includes an arcuate cutting lobe formed at one axial end to perform the deburring operation. The other axial end of each arm member is detachably connectable to a collet so that the arm members are substantially parallel to but spaced from each other and with the cutting lobes positioned on the outer periphery of each arm member. The space between the arm members forms an elongated longitudinal slot which, like the previously-known deburring tools, allows the arm members to flex together and permits passage of the cutting lobes through the hole to be deburred.

The collet in turn includes means for detachably securing the collet to a tool holding rod from a tool holder. Moreover, in the preferred form of the invention, each arm member includes a flat formed around its inner periphery which abuts against and registers with a like flat formed on the outwardly extending end of the tool holding rod. The abutting surfaces between the tool holding rod and the arm members not only ensures accurate positioning of the arm members, but also enhances a rigid engagement between the tool holding rod and the deburring tool arm members.

The easy detachability of the arm members from the collet of the deburring tool of the present invention permits easy replacement of the individual arm members when worn, broken, or chipped. Moreover, since an arcuate cutting lobe is formed on each arm member, the deburring tool of the present invention enjoys the full efficiency in operation as my previously-known deburring tool.

Moreover, if desired, a separate tensioning ring, such as disclosed in my previous U.S. Pat. No. 3,230,798 which issued on Jan. 25, 1966, can be attached to the deburring tool of the present invention and easily adjusted to vary the tension between the arm members without detaching the arm members from the collet.

BRIEF DESCRIPTION OF THE DRAWING

A better understanding of the present invention will be had upon reference to the following detailed description when read in conjunction with the accompanying drawing wherein like reference characters refer to like parts throughout the several views, and in which:

FIG. 1 is a front plan view showing the deburring tool of the present invention carried by a tool holder;

FIG. 2 is a cross-sectional view taken substantially along line 2—2 in FIG. 1 and enlarged for clarity;

FIG. 3 is a cross-sectional view taken substantially along line 3—3 in FIG. 1 and enlarged for clarity; and FIG. 4 is a fragmentary exploded view showing the attachment of the deburring tool of the present invention to a tool holding rod.

DETAILED DESCRIPTION OF A PREFERRED EMBODIMENT OF THE PRESENT INVENTION

With reference first to FIG. 1, the deburring tool 10 of the present invention is thereshown attached to a tool holder 12 by a tool holding rod 14 in a manner which will be subsequently described in greater detail. The tool holder 12 may be of any conventional construction such as that described in any of my previous U.S. Pat. Nos. 3,975,111; 3,661,473; 3,658,435; or 3,970,406.

While all of the aforementioned tool holders, of course, vary in construction amongst each other, each is adapted to receive an outwardly extending tool holding rod 14, which is coaxial with the axis of elongation for the tool holder 12. Moreover, each tool holder 12 is adapted to be carried and rotated about its axis of elongation by the chuck of a suitable rotary drive machine (not shown) so that the tool holding rod 14 rotates coaxially with the tool holder 12.

Referring now to FIGS. 1 and 4, the tool holding rod 14 is generally cylindrical in shape and includes a pair of diametrically opposed and substantially identical axial flats 16 and 18 formed on its outwardly extending end. The flats 16 and 18 together form a narrow protruding portion 20 at the outer axial end of the tool holding rod 14. In addition, each of the flats 16 and 18 forms a radial abutment surface 22 and 24, respectively, in the shape of a circle segment at the upper end of the protruding portion 20 of the tool holding rod 14.

The deburring tool 10 further comprises a first and a second, substantially identical, elongated arm member 26 and 28, respectively. Each arm member 26 and 28 is in the shape of a circle segment in cross section and thus includes a curvilinear outer surface 30 and a flat inner surface 32.

An arcuate cutting edge or lobe 34 is formed on the curvilinear outer surface 30 of each arm member 26 and 28. Each cutting lobe 34 is spaced axially somewhat from the free or outwardly extending end of its arm member 26 or 28 and a pilot portion 36 which curves inwardly from the cutting lobe 34 to the free end of the arm member 26 or 28 aids in the insertion of the deburring tool 10 into a hole to be deburred. Each cutting lobe 34 is further provided with a substantially radially extending flat surface portion 38 on opposite sides of the deburring tool 10 and with sharp cutting edges 40 at each axial side of the cutting lobe 34.

With reference now to FIGS. 1, 3 and 4, in order to assemble the deburring tool 10, the flat surface 32 of the arm members 26 and 28 at the end opposite from the cutting lobes 34 are positioned against the flats 16 and 18, respectively, on the protruding portion 20 of the rod 14. In addition, the upper axial end of each arm member 26 and 28 abuttingly engages its respective abutment surface 22 and 24 on the rod 14. With the arm members 26 and 28 thus positioned, the flat surfaces 32 of the arm members 26 and 28 face each other so that the cutting lobes 34 are positioned on the outer periphery of the deburring tool 10. Moreover, the arm members 26 and 28 are substantially parallel to but spaced from each other thus forming an elongated longitudinal tensioning slot 42 between the arm members 26 and 28. Preferably the curvilinear periphery 30 of each arm member 26 and 28 is flush with the outer periphery of the tool holding rod 14.

A cylindrical collet 44 having an axial through bore 46 is positioned over the deburring tool 10 so that the collet 44 overlaps a portion of both the tool holding rod 14 and the arm members 26 and 28. As best shown in FIGS. 1 and 2, a radial threaded bore 48 in the collet 44 threadably receives an Allen set screw 50 which, upon tightening, abuts against a flat 52 in the tool holding rod 14 above the abutment surface 22. The set screw 50 thus attaches the collet 44 to the tool holding rod 14.

With reference no to FIGS. 1 and 3 at a position spaced axially downwardly from the aforementioned radial bore 48, a further pair of diametrically opposed threaded radial bores 54 and 56 are formed through the collet 44. The threaded bores 54 and 56 also threadably receive an Allen set screw 58 and 60, respectively. The radial bores 54 and 56 are positioned around the collet 44 so that, upon tightening, the set screws 58 and 60, respectively, abut against the upper end of the arm members 26 and 28 around the protruding portion 20 and thereby secure the arm members 26 and 28 to the tool holding rod 14 via the collet 44.

If desired a tensioning ring 62, such as described in my aforementioned United States Patent can be attached to the arm members 26 and 28 at any desired axial position. The tensioning ring 62 varies the tension between the arm members 26 and 28 in the well known fashion and can be axially adjusted along the arm members 26 and 28 without removal of the arm members 26 and 28 from the collet 44.

It can thus be seen that the deburring tool 10 of the present invention provides a novel deburring tool in which the arm members 26 and 28 can be individually removed from the collet 44 without disassembly of the entire deburring tool 10. For example, should the cutting lobe 34 on the arm member 26 become worn, broken, or chipped, the arm member 26 can be easily removed from the collet 44 by loosening the set screw 58 and thereafter inserting and attaching a replacement arm member to the collet 44. Moreover, unlike the previously-known deburring tools with removal arm members, each of the arm members includes a cutting lobe 34 which ensures full operating efficiency of the deburring tool 10.

Having described my invention many modifications thereto will become apparent to those skilled in the art to which it pertains without deviation from the spirit of the invention as defined by the scope of the appended claims.

I claim:

1. A tool for removing burrs formed on the edge of drilled holes, said tool comprising:
   a first and second elongated arm member, each arm member having an arcuate cutting lobe formed on one axial end;
   a support member including a collet; and
   means for detachably securing each other axial end of each arm member to said support member within said collet, whereby said arm members are spaced from but substantially parallel to each other so that said cutting lobes are positioned on the outer periphery of each arm member.

2. The invention as defined in claim 1 wherein said support member includes means for abuttingly receiving said other axial ends of said arm members and said securing means comprises means for clamping said other axial ends of said arm members against said receiving means.

3. The invention as defined in claim 2 wherein said clamping means comprises at least two threaded members threadably received in said support member whereby, upon tightening, one threaded member abuts against one arm member while the other threaded member abuts against the other arm member.

4. In combination with a tool holder including an outwardly extending tool holding rod, a tool for removing burrs formed on the edge of drilled holes, said tool comprising:
   a first and second elongated arm member, each arm member having an arcuate cutting lobe formed on one axial end;
   means for detachably securing arm members to the outwardly extending end of the tool holding rod so that said arm members are spaced from and substantially parallel to each other and so that the cutting lobes are positioned on the outer periphery of each arm member;

wherein said securing means comprises a support member positioned around a portion of said tool holding rod and a portion of both of said arm members, said support having means for releasably clamping said arm members to said tool holding rod; and wherein the outwardly extending end of said tool holding rod includes two diametrically opposed axial flats, each of said arm members adapted to abut against one of said axial flats.

5. The invention as defined in claim 4 wherein said clamping means comprises at least two threaded members threadably received in diametric bores formed in the support member so that, upon tightening, one threaded member abuts against one arm member while the other threaded member abuts against the other arm member to thereby compressibly lock said arm members against said tool holding rod.

6. The invention as defined in claim 4 wherein said support member is a cylindrical collet having an axial through bore and wherein said tool holding rod is received through one end of the through bore while the arm members are received through the other end of the through bore.

* * * * *

UNITED STATES PATENT AND TRADEMARK OFFICE
CERTIFICATE OF CORRECTION

PATENT NO. : 4,320,998
DATED : March 23, 1982
INVENTOR(S) : Louis A. Kubicek

It is certified that error appears in the above—identified patent and that said Letters Patent is hereby corrected as shown below:

Column 1, line 22, delete "mmebers", insert --members--.

Column 5, line 4, delete "said support having", insert --said support member having--.

Signed and Sealed this

Twenty-fourth Day of August 1982

[SEAL]

Attest:

GERALD J. MOSSINGHOFF

*Attesting Officer*     *Commissioner of Patents and Trademarks*